Jan. 13, 1959   R. N. FALGE   2,867,910
PROJECTION LAMP AIMING
Filed Aug. 29, 1955   5 Sheets-Sheet 2
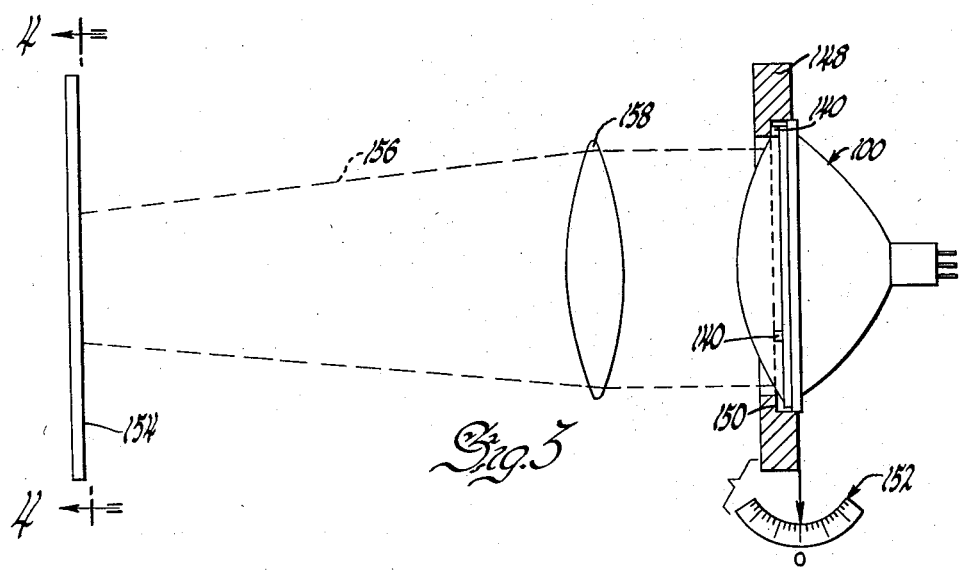
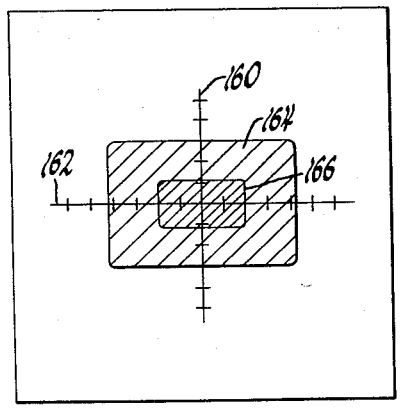
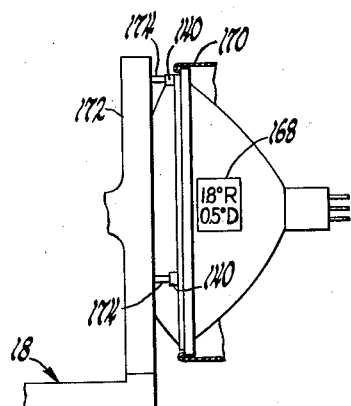
INVENTOR.
Robert N Falge
BY
E. W. Christen
ATTORNEY

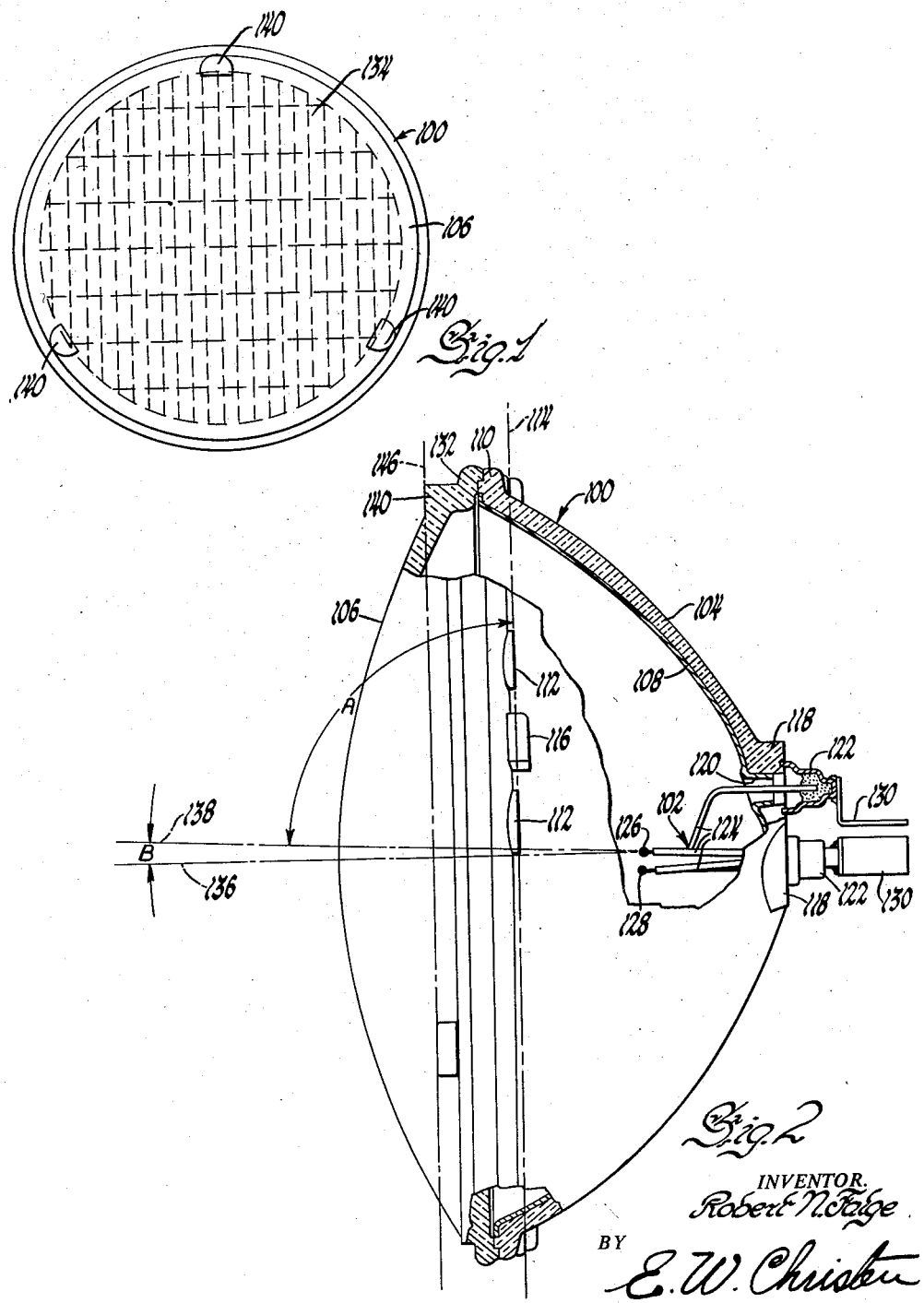

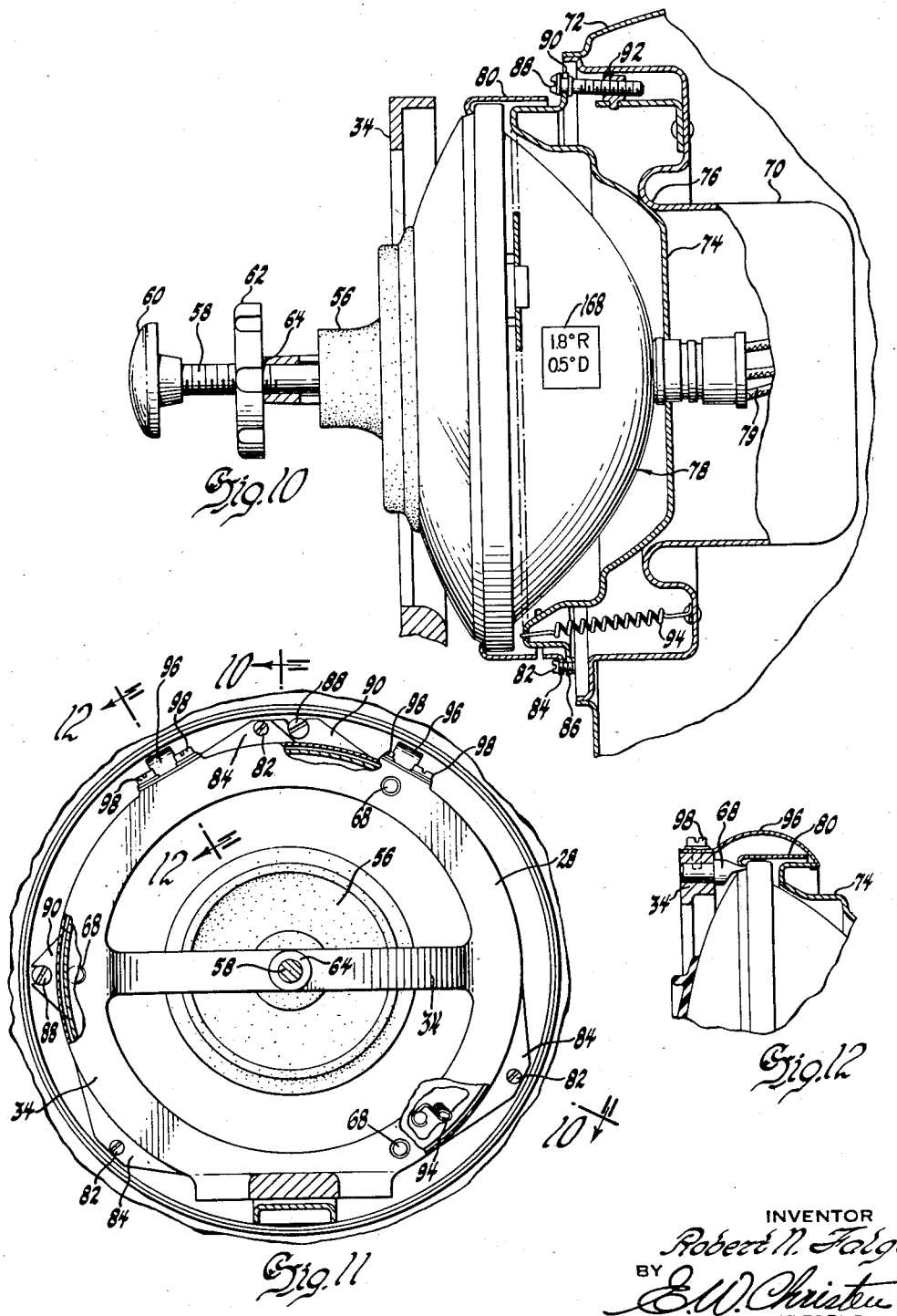

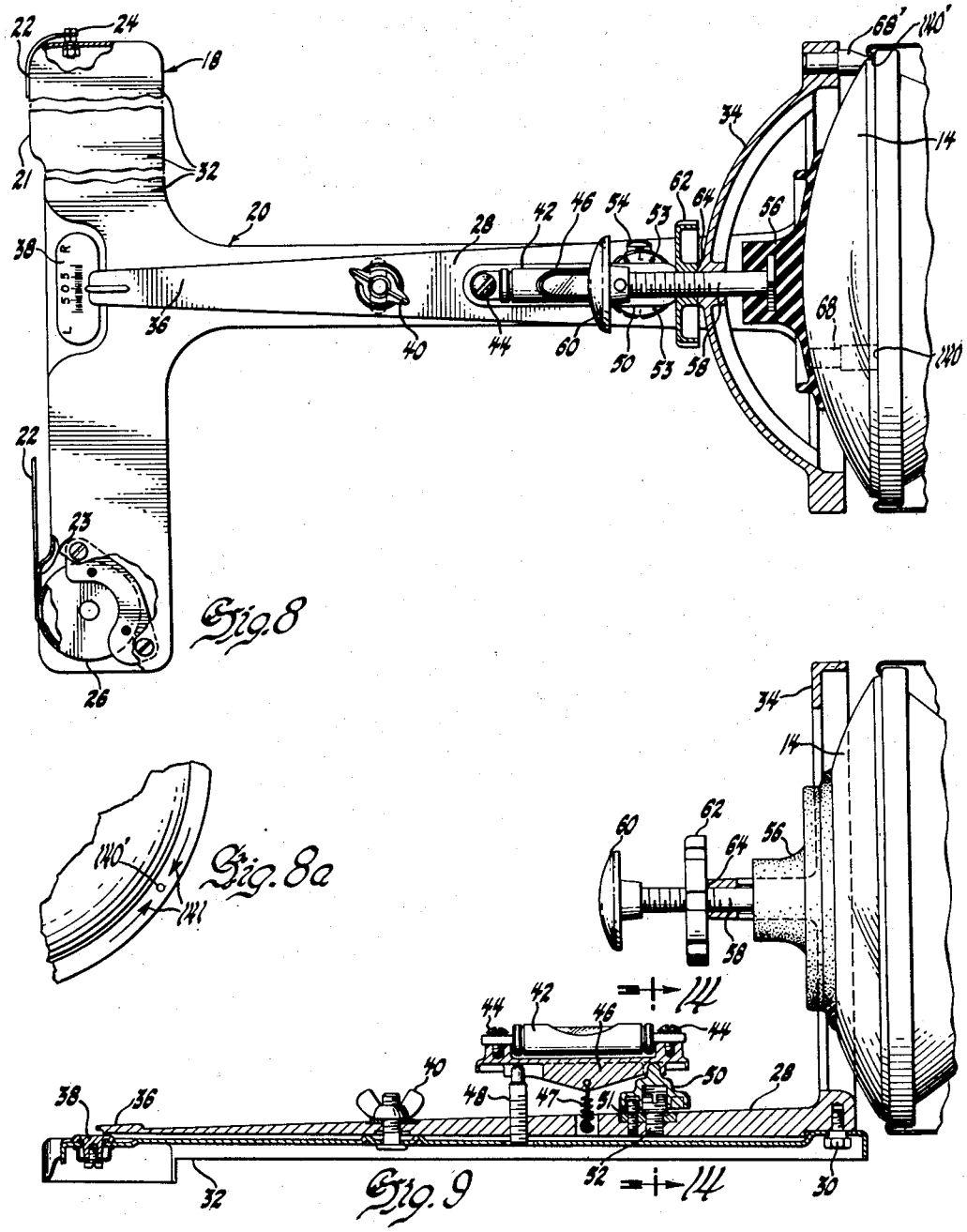

United States Patent Office

2,867,910
Patented Jan. 13, 1959

2,867,910

PROJECTION LAMP AIMING

Robert N. Falge, Anderson, Ind., assignor to General Motors Corporation, Detroit, Mich., a corporation of Delaware Application August 29, 1955, Serial No. 531,035

12 Claims. (Cl. 33—180)

This invention relates to aiming of projection lamps and more particularly to a method and apparatus for aiming projection lamps of the type which includes a combined light source and optical means for controlling the direction or distribution of light rays emanating from the source. This application is a continuation-in-part of U. S. application Serial No. 336,133, filed February 10, 1953, now abandoned.

This invention is especially well suited for use in conjunction with automotive vehicle headlamps. The vehicle lighting art has progressed in recent years to a high degree of development providing, in general, lamps of high efficiency, high candlepower, long life, and relatively low cost. Noteworthy in this respect are the lamps now known in the art as the "sealed beam" lamps such as the all glass and the composite types.

In projection lamps commercially available, even those representing the best presently known manufacturing techniques, there has remained the problem of ensuring accurate and simple directional control or aiming of the projected light beam. In vehicle headlamps the effect sought to be achieved, in general, is the adequate illumination of the roadway so that the operator may observe road conditions sufficiently far in advance, even at high speeds, to adjust the vehicle operation accordingly. However, it is equally important to safe vehicle operation that the light directivity and intensity be such that the operator of an oncoming vehicle is not blinded. Thus, with vehicle lamps of the candlepower necessary for adequate roadway illumination, very accurate directional control of the light beam is imperative.

There have been numerous approaches in the prior art to the solution of the problem of aiming vehicle headlamps. These may be characterized generally as either optical aiming or geometrical aiming. In optical aiming the lamp is mounted on the vehicle and illuminated; the light beam is directed upon a simple, remotely located aiming screen or a more complex optical equivalent and the beam pattern is positioned by directional adjustment of the lamp. Optical aiming of this type has proved to be disadvantageous because it requires elaborate equipment. It is, however, quite accurate because the projected light beam itself is aimed.

In geometrical aiming, the lamp is mounted on the vehicle and a selected axis of the lamp structure is directionally adjusted with reference to the straight-ahead direction or longitudinal axis of the vehicle. Geometrical aiming is highly advantageous in that the aiming apparatus required is simple and inexpensive. The aiming may be performed quickly and without the necessity of large space. Geometrical aiming heretofore has been inaccurate, however, because it pre-supposes the existence of a known relation between the projected light beam direction and the selected axis of the lamp structure. Such a known relation has not been obtained in commercially produced lamps because of lack of sufficient precision in the relative positioning of the parts of the optical system. Although there has been much effort to improve the assembly technique to ensure the required precision, this effort has not yielded a commercially successful "optically perfect" lamp. As a result, commercial lamps are "optically imperfect" due to manufacturing tolerances inherent in the known techniques. This optical imperfection is manifested by the lack of uniformity among successive lamps, manufactured by the same apparatus and technique, of the relationship between light beam direction and a selected geometrical axis of the lamp structure. The result is a random deviation angle between the light beam direction and any selected geometrical axis of the lamp structure.

However, the present-day commercial practice in the manufacture of lamps, even though it yields optically imperfect lamps, affords compelling advantages of efficient production. Therefore, it is desirable to retain these advantages in the provision of a lamp which may be aimed with the simplicity of geometrical aiming and the accuracy of optical aiming.

In aiming vehicle headlamps by either optical or geometrical means, it is a common practice to angularly deflect the light beam somewhat with respect to the straight-ahead or longitudinal axis of the vehicle. Heretofore the establishment of this deflection angle by a geometrical aiming instrument has been inaccurate because the technique and apparatus failed to account for the random angular deviation between the direction of the light beam and the selected geometrical axis of the lamp structure.

It has been a common practice to aim headlamps with reference to the upper or driving beam projected from the lamp. Among other reasons, this practice is due to the aiming technique and apparatus heretofore available. However it is often considered desirable to be able to establish the headlamp aim with reference to the low beam for reasons of safety. The establishment of proper aim on one beam does not ensure that the other beam will be properly aimed because of optical inaccuracies in the lamp. It is desirable, therefore, to provide aiming apparatus and technique which permits accurate aiming on either high beam or low beam.

Therefore, it is an object of this invention to provide a commercially produced projection lamp which may be aimed with optical precision by the use of geometrical aiming apparatus.

It is another object of this invention to provide a method of aiming a projection lamp which permits the use of a geometric instrument for aiming of the light beam projected from a lamp with optical precision.

A further object is to provide an improved aiming instrument for projection lamps which is adapted for aiming either the upper or lower light beam.

Another object is to provide a method and apparatus for aiming the light beam projected from a lamp without the necessity of energizing the lamp during the aiming operation.

It is an additional object to provide an aiming instrument which is compact, inexpensive to manufacture, simple to operate, and which is adapted for use in vehicle service stations which are not equipped with elaborate aiming facilities.

An additional object is to provide an improved projection lamp having structural features which facilitate precise aiming of the light beam projected from the lamp.

In the accomplishment of these and other objects there is provided a lamp including a light source and optical means, and having plural readily re-identifiable reference means disposed upon an easily accessible portion of the lamp structure which define an aiming plane. The angular position of the aiming plane, which bears an initially unknown and random angular relation to the direction of the light beam, is determined precisely with respect to the light beam direction by optical means and the lamp is calibrated accordingly. Upon installation of the lamp for its intended use, an aiming instrument, adjustable in accordance with the calibration, is attached to the lamp and positioned with reference to the aiming plane to effect the aiming operation.

A more complete understanding of the invention may be had from the detailed description which follows taken with the accompanying drawings in which:

Figure 1 is a front view of the lens of one embodiment of the inventive lamp.

Figure 2 is a side view in partial section showing the projection lamp of Figure 1.

Figure 3 is a diagrammatic illustration of apparatus for performing one step in the inventive method.

Figure 4 is a view taken on lines 4—4 of Figure 3.

Figure 5 illustrates the coaction of features of the inventive lamp and aiming instrument.

Figure 8 is an enlarged view partially in section taken on lines 8—8 of the apparatus shown in Figure 6.

Figure 8a is a fragmentary view of the lamp.

Figure 9 is a side view partially in section taken on lines 9—9 of the apparatus shown in Figure 6.

Figure 10 is a sectional view taken on lines 10—10 of Figure 11.

Figure 11 is a front view, with parts broken away, of the aiming apparatus mounted on a headlamp.

Figure 12 is a fragmentary view taken on the lines 12—12 of Figure 11.

Figure 6:
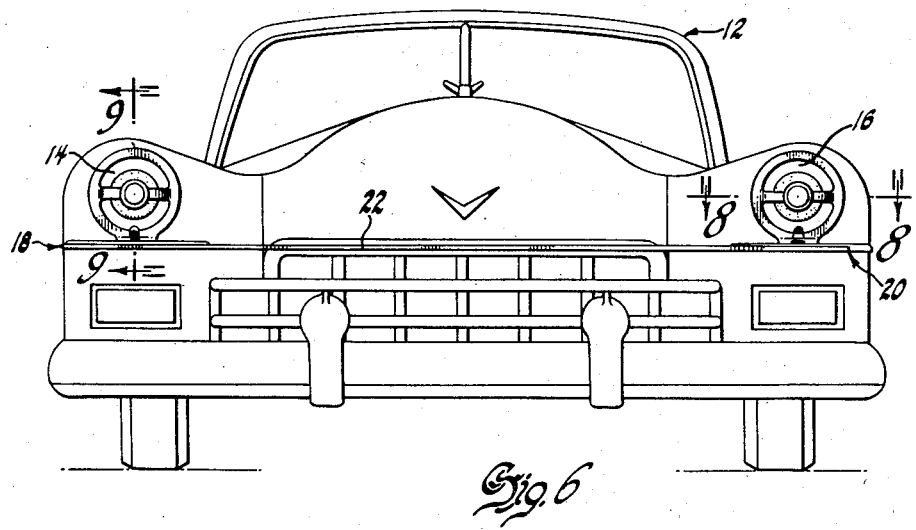
Figure 6 is a front view of a vehicle having the apparatus of this invention mounted thereon.

In the specification there is employed the terminology "optically imperfect lamp" in recognition of the fact that strict optical perfection in lamp manufacture is not attained. The meaning intended to be conveyed by this language is that the lamp is subject to optical inaccuracies occasioned by manufacturing tolerances which are acceptable in the commercial production of projection lamps. The optical imperfections which arise, for example, are lack of precision in locating the light source with respect to the focal point of an associated reflector, surface irregularities in the reflector which cause a departure from the desired mathematical curvature, and lack of precise positioning and orientation of the lens as well as surface irregularities therein. Such optically imperfect lamps are characterized by slight non-uniformity of optical properties among different lamps produced by the same technique and apparatus.

Referring now to the drawings, there is shown an illustrative embodiment of the invention in a projection lamp and aiming device especially suitable for use in automotive vehicle lighting. The invention will be set forth by description of the projection lamp with reference to Figures 1 and 2, the manner of calibrating the projection lamp with reference to Figures 3 and 4, followed by a description of the aiming apparatus and technique with reference to Figures 5 through 12.

Referring now to Figures 1 and 2, the projection lamp 100 comprises, in general, a light source designated generally at 102, enclosed by a reflector 104 for imparting directional control to the light rays emanating from the light source, and an integrally joined lens or cover glass 106 which may impart distributional control to the light rays controlled by the reflector. The reflector 104 is provided with a reflective inner surface or coating 108, preferably a bright metallic deposit. The reflector 104 may be constructed of glass and is suitably molded to provide a configuration having the desired optical properties. For example, the inner surface may be a surface of revolution of paraboloidal curvature or a combination of such surfaces. The reflector 104 terminates in an annular flange 110 which is provided with a plurality of spaced seating surfaces 112 which define a mounting plane 114 and a plurality of orienting lugs 116 for engagement with an associated mounting ring 74 (Figure 10) for installation of the lamp. The reflector 104 is provided with integrally formed spaced bosses 118 which define passages 120 extending through the reflector. Disposed centrally of the bosses and extending through the reflector 104 is the usual evacuating passage (not shown).

The reflector 104 supports the light source 102 by means of metal ferrules 122 disposed over passages 120. Each metal ferrule 122 is embedded at its open end in the respective boss 118 to provide a gas tight seal and structural support for the ferrules. The metal ferrules 122 support lead wires 124, suitably secured to the ferrule by brazing. A light source in the form of filament 126 is connected across one pair of lead wires and may be disposed somewhat above the focal point of the reflective surface 108 thus constituting the minor filament for producing the minor or lower beam to be projected from the lamp. The filament 128 is connected across the other pair of lead wires at the focal point of the reflective surface 108 and constitutes the major filament for producing the major or upper beam to be projected from the lamp. The ferrules 122 are adapted for connection with an associated energizing circuit (not shown) by terminals 130 which are suitably affixed to the ferrules by soldering.

The lens or cover glass 106, suitably of molded glass, is provided with an annular flange or rim 132 which is integrally joined by fusion to the annular flange 110 of the reflector 104. The interior surface of the lens 106 may be provided with fluting and light controlling prisms indicated schematically at 134 in a manner well understood by those skilled in the art. The lens 106 is oriented with respect to the reflector body 104 by a suitable orienting key (not shown) on the annular flange 132. The lamp 100 comprising the integrally combined reflector body 104, lens 106 and light sources 126 and 128 is preferably filled with an inert gas to a pressure exceeding atmospheric pressure and the lamp is hermetically sealed by closure of the aforementioned evacuating passage.

The projection lamp thus far described is known in the art as the all glass sealed beam lamp and so far as is known represents the application of the most advanced techniques in lamp manufacture. However, lamps of this type and other projection lamp types, such as that known as the composite sealed beam lamp, are optically imperfect lamps due to tolerances incident to the manufacturing techniques. An ideal projection lamp insofar as aiming the projected light is concerned may be considered, for explanatory purposes, one which directs selected light rays in a known direction relative to a selected geometrical axis of the lamp structure. This ideal lamp is not achieved in commercial production because of lack of precise relative positioning of the parts of the optical system and inaccuracies in individual parts of the system. Thus, a typical optically imperfect lamp, as illustrated in Figure 2, may project a light beam having a direction indicated by the line or actual optical axis 136 which is not coincident with the intended light beam direction or desired optical axis 138. The intended light beam direction 138 has a known angular displacement A, such as 90 degrees, from a geometrical reference on the lamp structure, such as the mounting plane 114 defined by the surface of seating lugs 112. Consequently, the actual light beam direction 136 is displaced from the desired light beam direction 138 by an unknown deviation angle B arising from optical imperfection in the lamp. The effect of the optical imperfections, whatever the cause, has been to preclude precise aiming of the projected light by simple geometrical aiming instruments because the deviation angle B varies in a random fashion in successive lamps.

In accordance with this invention precise geometrical aiming of the projected light beam is permitted by the provision of an aiming plane on the lamp in conjunction with a calibration value to compensate for the deviation angle. There is provided on the lamp structure, preferably at an easily accessible location, a plurality of spaced, readily re-identifiable, reference elements 140 which may take the form of a boss, flat surface, or projection disposed adjacent the periphery of the lens 106 and preferably are formed integrally therewith. The reference elements 140 define or lie in a common aiming plane 146. At this point in the fabrication of the lamp, the angular position of the aiming plane 146 is unknown with respect to the direction of the projected light beam 136 because of the aforementioned deviation angle. Furthermore, the angular relation between aiming plane 146 and the mounting plane 114 is unknown and varies in successive lamps in a random manner. This unknown relation occurs because of variations in rim thickness or stack-up. In joining the lens 106 to the reflector 104 it is not uncommon for the rim thickness, constituted by flanges 110 and 132, to vary somewhat with circumferential position, thus causing the planes 114 and 146 to be out of parallelism. It now remains to determine the exact angular relation between the light beam direction 136 and the aiming plane 146.

This determination may be made with respect to any selected portion of the light beam. In automotive vehicle headlamps, it is a common practice to aim the lamps to afford directional control of the most intense portion of the light beam projected from the lamp. This intense portion of the beam is commonly referred to as the hot spot light, whereas the surrounding portion of the beam is known as the body light. The distribution patterns of the hot spot light and the body light are controlled by appropriate optical design usually incorporated into the lens structure.

Thus, in the practice of this invention as applied to the automotive vehicle headlamps, it is preferred to determine the aiming plane position with respect to the direction of hot spot light portion of the projected beam. Furthermore, in automotive practice, it is desirable to aim the hot spot light at a specified deflection angle with respect to the straight-ahead direction or longitudinal axis of the vehicle. The aiming specification may be for either upper or lower beam aim. The actual aim, for example, may be specified with respect to the vehicle axis as 0.4 degree down in the vertical plane and 2.0 degrees right in the horizontal plane or any other suitable values depending upon the particular lamp and installation. This aiming specification, of course, has reference to the light beam direction. In order to effect lamp aiming in accordance with such a specification by use of the aiming plane 146 and a geometrical instrument the deviation angle B must be taken into account. Suppose, for example, the deviation angle is 0.2 degree right and 0.1 degree up with respect to the intended light beam direction 138 for a particular lamp. A compensated deflection angle or calibration angle for the given lamp is then derived as the algebraic difference of the aiming specification and deviation angle, or 1.8 degrees right and 0.5 degree down.

A suitable manner in which the compensated deflection angle or calibration angle may be ascertained is illustrated in Figures 3 and 4. As shown in Figure 3, the lamp 100 is mounted in a dirigible aiming head 148, and is connected to an electrical source (not shown) to energize the selected beam filament of the lamp. The aiming head 148 comprises an annular seating surface 150 adapted to receive the reference elements 140 of the lamp in close seating engagement. The aiming head 148 is rotatable about a pair of rectangularly disposed coordinate axes, such as horizontal and vertical axes, and is provided with a suitably calibrated indicating means, shown schematically at 152, on each axis for indicating angular displacement of the aiming head about the axes. In the zero position, the seating surface 150 of the aiming head is preferably parallel to a remotely positioned aiming screen 154 which defines a reference aiming plane.

The light beam, designated schematically at 156, projected from the lamp 100, may be projected through any suitable optical system represented by a condensing lens 158 to the aiming screen 154. As shown in Figure 4, the aiming screen 154 is provided with suitable reference means such as the rectangular coordinate lines 160 and 162. The intersection of the coordinate lines may be offset from the center line of the aiming head 148 in accordance with the aiming specification or uncompensated deflection angle. For purposes of illustration, a light beam is shown which produces an illumination pattern on the screen having a configuration 164 which depends upon the optical design of the lamp 100. The light beam includes a portion of hot spot light which produces a pattern 166 of a high level of illumination on the screen. The lamp 100 is aimed by directional adjustment of aiming head 148 until an axis of a selected portion of the beam is positioned in the desired relation with the coordinate lines and on the aiming screen.

With the selected axis of the light beam adjusted to its desired position on the aiming screen, the angular values of the indicating means 152 for both the horizontal and vertical axes are noted. These values constitute the calibration or compensated deflection angles for the lamp and are preferably recorded on the lamp for subsequent use in aiming.

As shown in Figure 5, the aforementioned lamp is provided on the structure thereof with a calibration medium, such as a tag or imprint 168, bearing the calibration data which specifies the compensated deflection angles for the lamp. For example, this data may be recorded as 1.8 degrees right and 0.5 degree down. Proper aim of the light beam will be achieved by adjusting the aiming plane of the lamp such that a line perpendicular thereto is inclined at this calibration angle with respect to the straight-ahead direction of the vehicle. The aforementioned lamp, as shown in the fragmentary view of Figure 5, is installed in a dirigible mounting represented by retaining ring 170. A geometrical aiming instrument, designated generally at 18, comprises a support member 172 having plural seating members 174 defining a seating plane in engagement with the reference elements 140 of the lamp 100. It is noted that the same aiming plane, that defined by elements 140 is used for engagement with the aiming head 148 during calibration and for engagement with the seating members 174 of aiming instrument 18 during the aiming operation. This ensures that the direction of the projected light beam itself is aimed when the aiming instrument 18 is set in accordance with the calibration data.

The inventive aiming instrument will be described with reference to Figures 6 through 12 in conjunction with a modification of the lamp. The lamps 14 and 16, Figure 6, are also of the sealed beam type but the reference elements take the form of re-identifiable surface portions or points 140' on the lens of the lamp as shown in Figure 8a. These surface portions 140' may be identified by local coloration or distinctive marks 141 or merely by relative location to other lamp parts.

Figure 7:
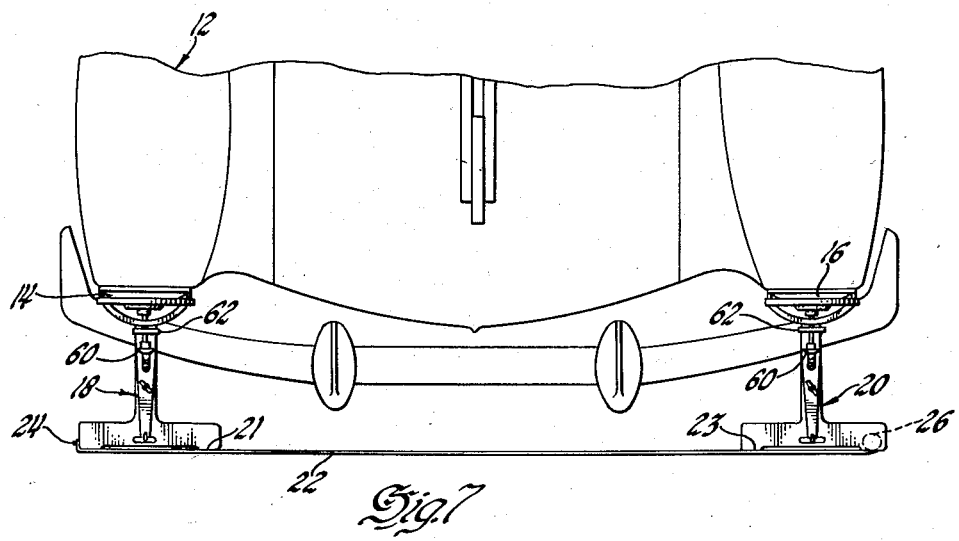
Figure 7 is a top view of the vehicle and aiming apparatus shown in Figure 6.

Referring now to Figures 6 and 7 there is shown a motor vehicle 12 having mounted thereon the lamps 14 and 16. Removably secured to the headlamps 14 and 16 is the apparatus of the present invention which includes a pair of instruments indicated generally at 18 and 20 connected by an alignment member or flexible tape 22. Instrument 18 is identical to instrument 20 with the exception that the former is provided with a tape hook pin or latch 24 for securing one end of the flexible tape 22 when stretched between the instruments and the latter is provided with a spring-biased tape reel 26 for housing the flexible tape 22 when the apparatus is not in use. Both the tape hook pin 24 and tape reel 26 are shown in more detail in Figure 8 where instrument 20 is shown in an enlarged view with a portion broken away to permit illustration of the corresponding portion of instrument 18.

As shown in Figures 8 and 9, each of the instruments 18 and 20, formed of a light metal or alloy, includes a support or frame member 28 which is adapted to be temporarily attached to one of the headlamps and to which is connected by means of pivot screw 30 a T-shaped aiming element 32. The frame 28 comprises an annular portion or ring 34 having substantially the same diameter as that of headlamp 14, and a reference arm or pointer 36 secured to the base of the ring 34 and extending outwardly at a right angle thereto.

The T-shaped aiming element 32 is angularly adjustable in relation to the frame 28 and may be turned to any desired setting as indicated by the horizontal adjustment scale 38 and, if desired, locked against movement by tightening wing nut 40. Also secured to the frame member 28 on arm 36 is a level indicating device such as spirit level 42 which is fastened by screws 44 to a support member 46. The support member 46 is secured to the frame 28 by a spring 47 and its adjustment relative to the arm 36 is provided by adjusting screw 48 and adjusting spindle 50 which threadedly engages shoulder screw 52. The level indicating device 42 is tilted up or down relative to the arm 36 by turning adjusting spindle 50. Around the periphery of the adjusting spindle 50 are a plurality of notches 53 numbered in accordance with a predetermined calibration system, suitably in angular values in degrees. A spring pawl 54 is provided for locking the level indicating device 42 in a predetermined inclination by engaging one of the notches 53 corresponding to the desired adjustment. Set screw 51 precludes complete rotation of the spindle.

The annular portion or ring 34 of the frame 28 houses a suction cup 56 adapted to firmly grip headlamp 14 when pressed against it. The suction cup 56 is supported by a rod 58 threaded over a portion of its length. Proper positioning of each of the instruments 18 and 20 on the lamps 14 and 16 respectively is provided by a plurality of seating elements or flat tapered aligning pins 68 terminating in a common plane and disposed around the periphery of the ring 34 and adapted to abut the reference elements 140' adjacent the edge of the lamp which define the aiming plane and thereby establish exact parallelism between the aiming plane of the lamp and the plane of the ring 34. After aligning the seating pins with the reference elements 140' the frame 28 is attached to headlamp 16 by pressing knob 60 axially to force the suction cup 56 into contact with the lens and thereafter tightening pressure knob 62, which is threaded on rod 58, against surface 64 to urge seating pins 68 into close engagement with reference elements 140'.

Figure 10 illustrates the apparatus secured to a typical sealed beam headlamp 78 mounted on a vehicle fender 72 in a known manner. The mounting structure comprises a socket or housing member 70 having disposed therein a bowl-shaped seating member 74 adapted to contact the socket member 70 at the annular seating surface 76 of the socket member. The seating member 74 is adapted to receive the lamp 78 which is connected by wires 79 to an electrical energizing circuit in a known manner. The lamp 78 is secured within the seating member 74 by means of an annular retaining ring 80 which is connected to the seating member 74 by a plurality of screws 82 which extend through flanged portions 84 of the retaining ring 80 and threadedly engage corresponding flanged portions 86 of the seating member 74. The mounting structure just described constitutes a dirigible support for the lamp 78 which may be adjusted angularly by means of a plurality of adjusting screws 88 which extend through flanged portions 90 of the seating member 74 and threadedly engage nuts 92 which are secured to the housing member 70. Disposed oppositely from the adjusting screws 88 is tension spring 94 which cooperates with the adjustment screws 88 to secure the seating member 74 in engagement with the socket member 70 at a desired angular adjustment.

As shown in Figures 11 and 12 the annular ring 34 is provided with safety springs 96 secured to ring 34 by a plurality of machine screws 98. As shown in Figure 12, the safety springs are adapted to engage the outer edge of the seating member 74 to prevent the aiming apparatus falling away from the lamp in case the suction cup is accidentally loosened.

The aiming operation will be described with reference to Figures 6 and 7, assuming that the vehicle 12 is in a level attitude. The aiming apparatus which includes instruments 18 and 20 is attached to the respective headlamps 14 and 16. The attachment is effected in the manner previously described and care should be exercised to ensure that the seating pins 68 and 68' are in close engagement with the reference elements 140'. In this condition the arm 28 is disposed perpendicularly to the aiming plane defined by the reference elements 140'. The tape 22 is drawn from the reel 26 on instrument 20 and secured at its free end to the hook pin 24 on instrument 18. The spring tension exerted by reel 26 causes the tape to remain taut across the forward surfaces of the T-shaped reference members 32.

Each aiming instrument is then preset in accordance with the calibration or compensated deflection angle of the respective lamp, which is recorded on the lamp structure as previously described. For example, if the calibration of the lamp 14 is 1.8 degrees right and 0.5 degree down, the T-shaped reference member 32 of instrument 20 is angularly displaced about pivot screw 30 until pointer 36 indicates 1.8 degrees right on the scale 38 and is locked in place by tightening wing nut 40. The level indicating device 42 is preset by rotation of spindle 50 until the calibrated notch 53 indicates 0.5 degrees down. The aiming instrument 18 is preset in the same manner in accordance with the calibration of lamp 16.

With the calibration values preset in the aiming instruments 18 and 20 the aiming operation is completed by adjustment of the angular position of each of the lamps 14 and 16. This is accomplished by manipulating the adjusting screw 88, for adjustment in the vertical plane, of each lamp until the spirit level bubble is centered. The adjusting screw 88 of each lamp, for adjustment in the horizontal plane, is manipulated until the tape 22 just contacts the surfaces 21 and 23 of the T-shaped reference members of both instruments 18 and 20. In this condition the light beam projected from each of the lamps 14 and 16 is directed, with respect to the straight-ahead direction or longitudinal axis of the vehicle, in accordance with the aiming specification or specified deflection angle.

The description of this invention has been given with respect to particular embodiments for illustrative purposes only and is not to be construed in a limiting sense. Many modifications and variations within the spirit and scope of the invention will now occur to those skilled in the art. For a definition of the invention, reference is made to the appended claims.

I claim:

1. An aiming instrument comprising a support member having a plurality of spaced seating elements terminating in a common plane, a reference arm on the support member extending at a predetermined angle with respect to said plane, an aiming element pivotally mounted on the support member for angular adjustment with respect to the reference arm, and a level indicating device adjustably mounted on the reference arm for angular adjustment with respect to the arm.

2. An aiming instrument comprising a support member having a plurality of distinct and spaced seating elements terminating in a common plane, securing means on the support member adapted for attachment of the instrument to a dirigibly mounted projection lamp with said seating elements in engagement with the lamp, a reference arm rigidly mounted on the support member and extending in a direction perpendicular to said common plane, an aiming element having a portion extending transversely of the reference arm and pivotally mounted on the support member for angular adjustment with respect to said common plane, and a level indicating device adjustably mounted on the reference arm for angular adjustment with respect to said common plane.

3. Apparatus for aiming a pair of dirigibly mounted vehicle lamps comprising a pair of instruments each including a support member having plural spaced seating elements extending therefrom and terminating in a common plane, means for securing the support member to a dirigible lamp with the seating elements in engagement with spaced points on the lamp, a reference arm rigidly mounted on the support member and extending outwardly in a direction perpendicular to the common plane, an aiming element pivotally mounted on the support member and having a portion extending transversely of the reference arm, a level indicating device adjustably mounted on the reference arm, and alignment means extending between the pair of instruments and disposed adjacent the transversely extending portion of the aiming element on each of the instruments.

4. Apparatus for aiming a pair of dirigibly mounted vehicle lamps in the vertical and horizontal planes comprising a pair of instruments each including a support member having plural spaced seating elements extending therefrom and terminating in a common plane, means for securing the support member to a dirigible lamp with the seating elements in engagement with spaced seating surfaces on the lamp, a reference arm rigidly mounted on the support member and extending outwardly therefrom in a direction perpendicular to the common plane, an aiming element pivotally mounted on the support member for angular displacement in a horizontal plane in accordance with a predetermined calibration angle, said aiming element including a portion extending transversely of the reference arm, a level indicating device mounted on the reference arm for adjustable inclination in the vertical plane in accordance with a predetermined calibration angle whereby the aim in the vertical plane is established when the level indicating device indicates a datum value, and alignment means extending between said transversely extending portions on said pair of instruments whereby the aim in the horizontal plane is established when the transversely extending portions are aligned.

5. The method of aiming the projected light beam of a vehicle headlamp of the type in which the light beam direction bears a random angular relation to an aiming plane on the lamp comprising: determining the angular relation between the aiming plane and the direction of the light beam, positioning a geometrical instrument with reference to the aiming plane, and adjusting the direction of the instrument to aim the lamp.

6. The method of aiming the projected light beam of a vehicle headlamp of the type in which the light beam direction bears a random angular relation to any selected geometrical axis of the lamp structure including the steps of identifying an aiming plane on the lamp, determining the angular relation between the aiming plane and the direction of the projected light beam, seating a geometrical instrument on the aiming plane and adjusting the directivity of the instrument in accordance with the angular relation to aim the light beam.

7. The method of aiming the projected light beam of a vehicle headlamp of the type in which the light beam direction bears a random angular relation to any selected axis of the lamp structure comprising the steps of providing the lamp with an aiming plane, energizing the lamp for projecting a light beam therefrom, aiming the light beam with respect to a reference plane, determining the angular relation between the reference plane and the aiming plane, and adjusting the direction of the aiming plane in accordance with said angular relation to aim the light beam.

8. Apparatus for accurately geometrically aiming an optical device of the type having a plurality of spaced surface portions defining a geometrical aiming plane the disposition of which varies by known values from a reference plane having a known angular disposition with respect to the actual optical axis of said device; said apparatus comprising an instrument including a seating plane, said seating plane being adapted to be temporarily secured to said device in engagement with said aiming plane, and levelling means on said instrument settable in accordance with the value by which said aiming plane varies from said reference plane to position said instrument in a known position relative to said actual optical axis.

9. Apparatus for accurately geometrically aiming a projection lamp of the type having a plurality of spaced surface portions defining an aiming plane the disposition of which varies by known values in horizontal and vertical planes from a reference plane having a known angular position relative to the actual axis of a selected portion of the light rays from said lamp; said apparatus comprising an instrument adapted to be temporarily secured to said lamp in engagement with said aiming plane, adjustable levelling means mounted on said instrument and settable in accordance with the value by which said aiming plane differs from said reference plane in a vertical plane, and horizontally adjustably mounted means on said instrument settable in accordance with the variance by which said aiming plane differs from said reference plane in a horizontal plane, whereby upon making said adjustments in a horizontal and vertical plane said instrument will be disposed in a known position relative to said actual beam axis.

10. An improvement in a geometrical instrument for aiming an optical device of the type having an actual optical axis which bears a random angular relation to any selected geometrical axis of the device by reason of manufacturing inaccuracies, an accessible surface portion on said device defining an aiming plane having an after-determined value of angular relation in a vertical plane to said actual optical axis; the improvement in said instrument comprising a support member having a surface defining a seating plane demountably supportable on said aiming plane, a reference arm mounted on said support member at a predetermined angle with said seating plane, and a level indicating device adjustably mounted on said reference arm for angular adjustment in accordance with said after-determined value, whereby upon adjustment of said level indicating device said support member bears a known angular relation to said actual optical axis for aiming said device.

11. An improvement in a geometrical instrument for aiming an optical device of the type having an actual optical axis which bears a random angular relation to any selected geometrical axis of the device by reason of manufacturing inaccuracies, an accessible surface portion on said device defining an aiming plane having after-determined values of angular relation in horizontal and vertical planes to said actual optical axis; said improvement in said instrument comprising a support member having a surface defining a seating plane demountably supportable on said aiming plane, a reference arm mounted on said support member at a predetermined angle with said seating plane, a level indicating device adjustably mounted on said reference arm for angular adjustment in accordance with said after-determined value in a vertical plane, an aiming member adjustably horizontally mounted on said reference arm, said reference arm and aiming member being relatively horizontally adjustable in accordance with said after-determined value in a horizontal plane, whereby upon making said horizontal and vertical adjustments on said instrument the latter bears a known relationship to said actual beam axis.

12. A method of geometrically aiming a pair of vehicle headlamps of the type in which the actual optical axis of each headlamp bears a random angular relation to a given selected axis of the respective headlamp structures, each of said headlamps including an aiming plane having a known angular relation to its respective optical axis; said method comprising the steps of mounting a geometrical instrument on the aiming plane of each lamp, pre-adjusting each of said instruments in accordance with said known angular relation for its respective lamp whereby each instrument is disposed in a known position relative to the actual optical axis of its respective lamp, and adjusting said lamps in accordance with the position of said instruments.

References Cited in the file of this patent

UNITED STATES PATENTS

| | | |
|---|---|---|
| 1,461,187 | Harrington | July 10, 1923 |
| 1,563,509 | McCarthy | Dec. 1, 1925 |
| 1,838,226 | Jenkins | Dec. 29, 1931 |
| 2,167,803 | Graham et al. | Aug. 1, 1939 |
| 2,198,837 | Morgan | Apr. 30, 1940 |
| 2,252,476 | Wright | Aug. 12, 1941 |
| 2,266,329 | Mead et al. | Dec. 16, 1941 |
| 2,292,968 | Peters | Aug. 11, 1942 |
| 2,314,559 | Schilling | Mar. 23, 1943 |
| 2,514,878 | Kuperus | July 11, 1950 |
| 2,557,893 | Russell et al. | June 19, 1951 |
| 2,605,436 | Stone et al. | July 29, 1952 |
| 2,609,611 | Dickson | Sept. 9, 1952 |

UNITED STATES PATENT OFFICE
CERTIFICATE OF CORRECTION

Patent No. 2,867,910

January 13, 1959

Robert N. Falge

It is hereby certified that error appears in the printed specification of the above numbered patent requiring correction and that the said Letters Patent should read as corrected below.

Column 8, line 26, for "then present" read -- then preset --.

Signed and sealed this 26th day of May 1959.

(SEAL)
test:

RL H. AXLINE
testing Officer

ROBERT C. WATSON
Commissioner of Patents